United States Patent [19]

Tsuboi

[11] Patent Number: 5,223,873
[45] Date of Patent: Jun. 29, 1993

[54] MAGNIFICATION CHANGE-OVER DEVICE FOR A CAMERA

[75] Inventor: Takayuki Tsuboi, Kanagawa, Japan

[73] Assignee: Canon Kabushiki Kaisha, Tokyo, Japan

[21] Appl. No.: 831,074

[22] Filed: Feb. 5, 1992

Related U.S. Application Data

[63] Continuation of Ser. No. 453,056, Dec. 13, 1989, abandoned, which is a continuation of Ser. No. 296,928, Jan. 11, 1989, abandoned, which is a continuation of Ser. No. 125,734, Nov. 30, 1987, abandoned, which is a continuation of Ser. No. 862,798, May 13, 1986, abandoned.

[30] Foreign Application Priority Data

May 14, 1985 [JP] Japan .................. 60-102436
May 14, 1985 [JP] Japan .................. 60-102437
Jun. 14, 1985 [JP] Japan .................. 60-129339
Jun. 14, 1985 [JP] Japan .................. 60-129340

[51] Int. Cl.⁵ .................. G03B 5/00; G03B 13/12; G03B 17/38

[52] U.S. Cl. .................. 354/199; 354/222; 354/266

[58] Field of Search .................. 354/400, 402, 195.1, 354/195.12, 199-201, 219, 222, 233, 266; 352/139, 140, 171

[56] References Cited

U.S. PATENT DOCUMENTS

| | | | |
|---|---|---|---|
| 2,995,061 | 8/1961 | Briskin et al. | 354/199 |
| 3,002,422 | 10/1961 | Lohmeyer | 354/199 X |
| 3,194,139 | 7/1965 | Babrock | 354/199 |
| 3,212,422 | 10/1965 | Nerwin et al. | 354/199 |
| 3,260,184 | 7/1966 | Pagel et al. | 354/222 X |
| 4,161,756 | 7/1979 | Thomas | 350/429 X |
| 4,199,983 | 10/1978 | Tanaka | 354/222 X |
| 4,284,337 | 8/1981 | Ito et al. | 354/199 X |
| 4,413,893 | 11/1983 | Tomori | 354/195.12 |
| 4,445,757 | 5/1984 | Enomoto et al. | 354/195.12 X |
| 4,525,050 | 6/1985 | Ohashi | 354/195.12 |
| 4,602,867 | 7/1986 | Shimizu et al. | 355/55 |
| 4,768,066 | 8/1988 | Ito | 355/55 |
| 4,990,945 | 2/1991 | Cho et al. | 354/195.12 |

*Primary Examiner*—W. B. Perkey
*Attorney, Agent, or Firm*—Anderson Kill Olick & Oshinsky

[57] ABSTRACT

A magnification change-over device is arranged to be highly suitable for a camera of the kind having a photo-taking lens and a viewfinder arranged independently of each other. The device includes the photo-taking lens having an image magnification which is variable; the viewfinder which is arranged to have an image magnification thereof also variable; an operating device for varying the image magnification of the viewfinder; a detecting device for detecting the magnifying state of the viewfinder; and a driving apparatus for driving the photo-taking lens according to a detection signal of the detecting device when a shutter release operation is performed. After a magnification setting operation is performed on the viewfinder, the change-over device changes the magnification of the photo-taking lens according to the magnification of the viewfinder when a photographing operation is actually performed.

35 Claims, 13 Drawing Sheets

FIG.5
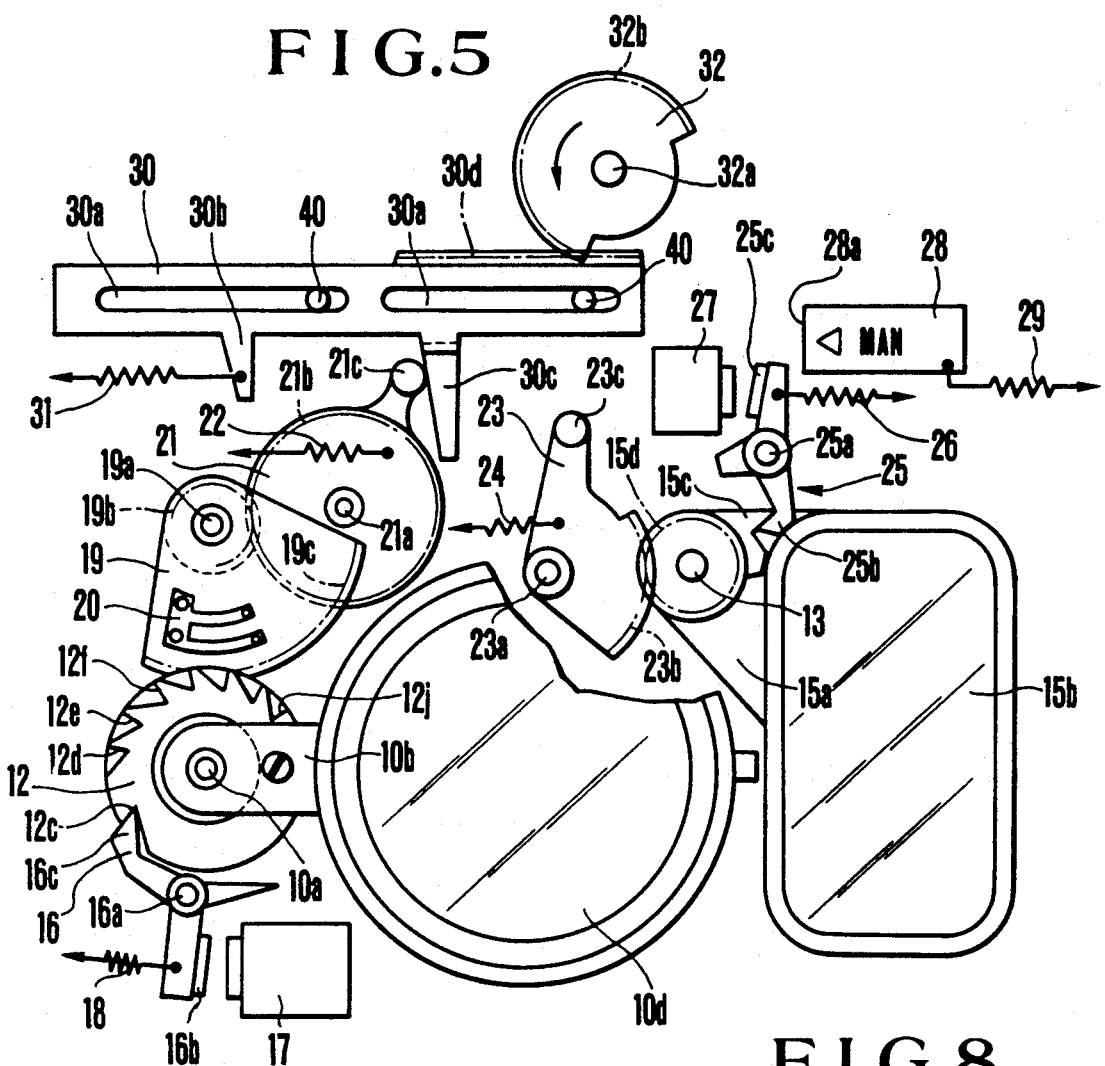
FIG.9
FIG.8
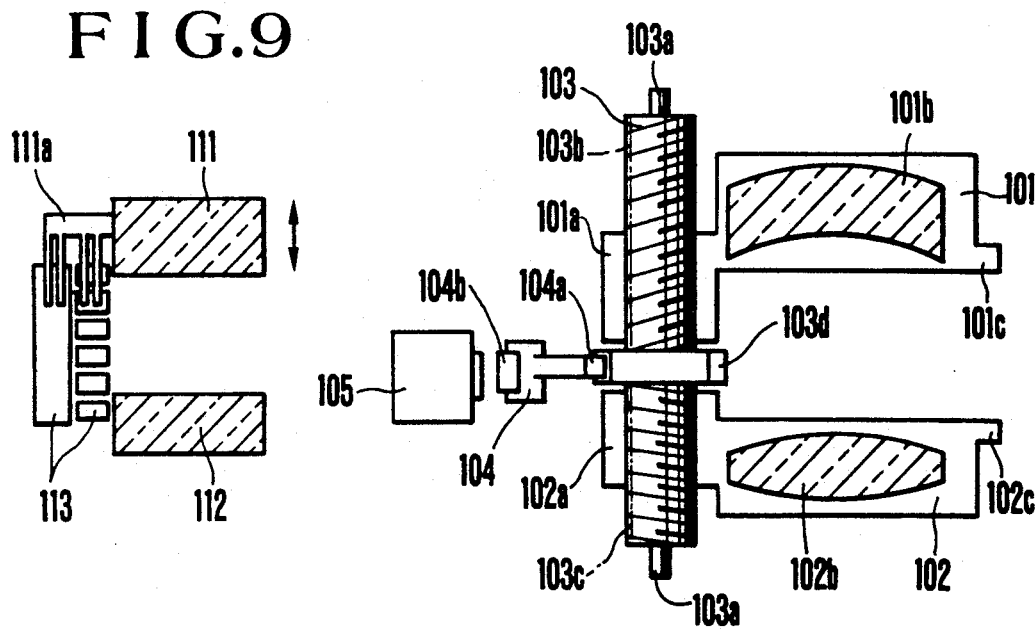

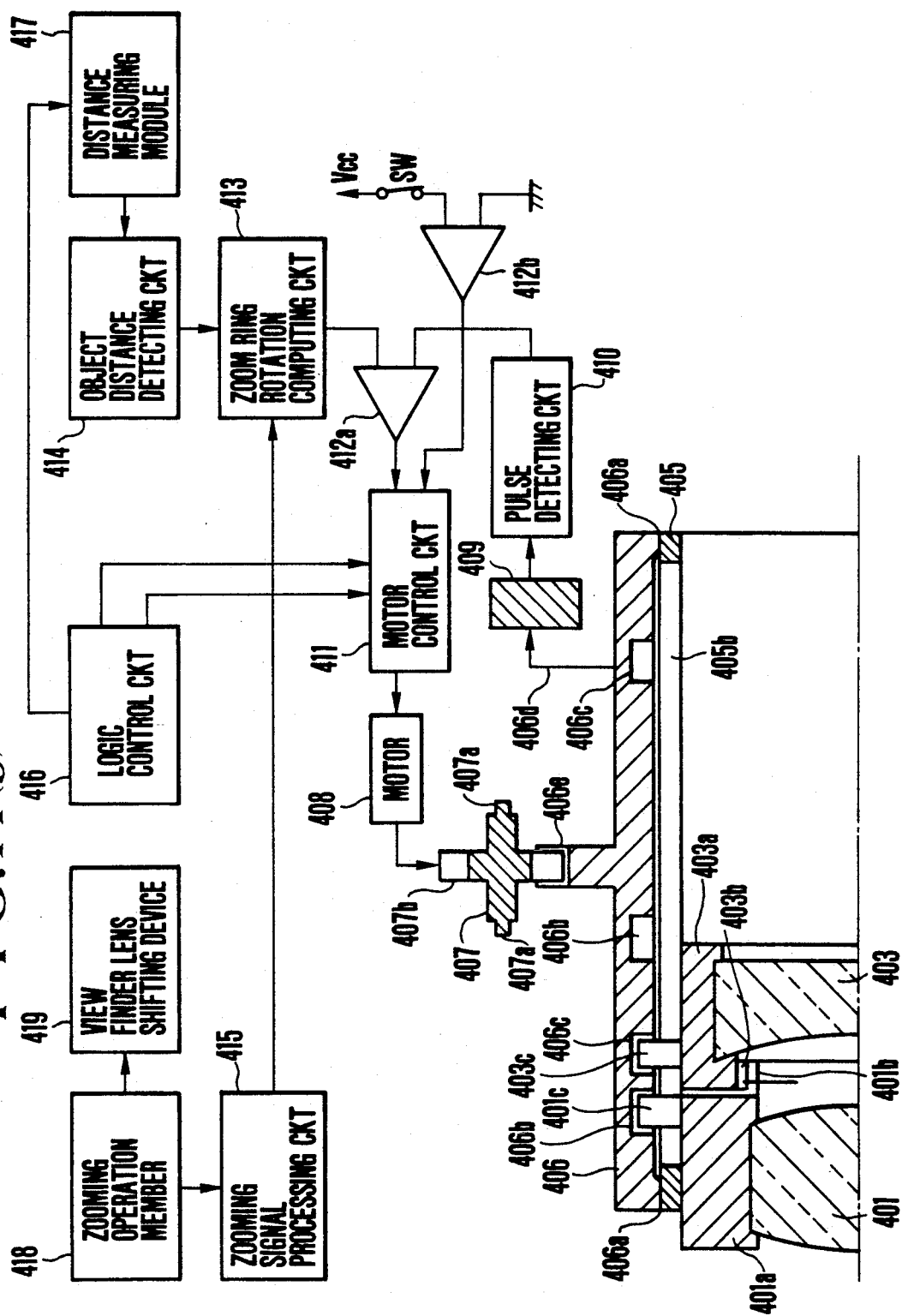

FIG.15(a) FIG.15(b)
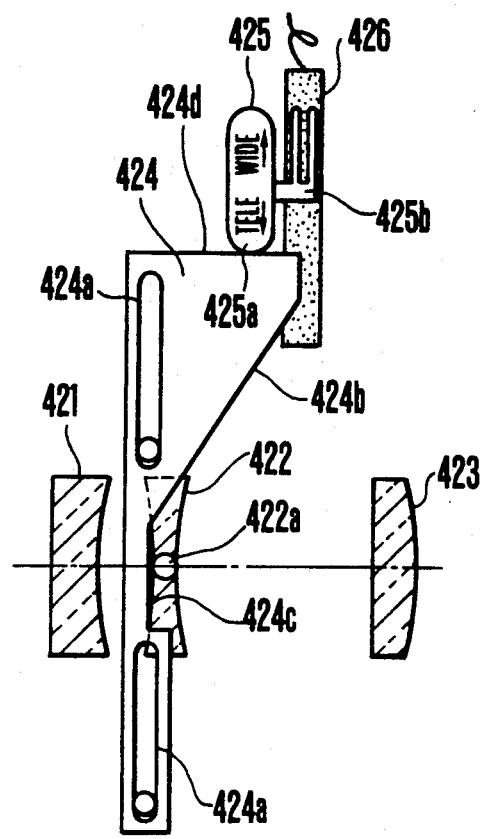
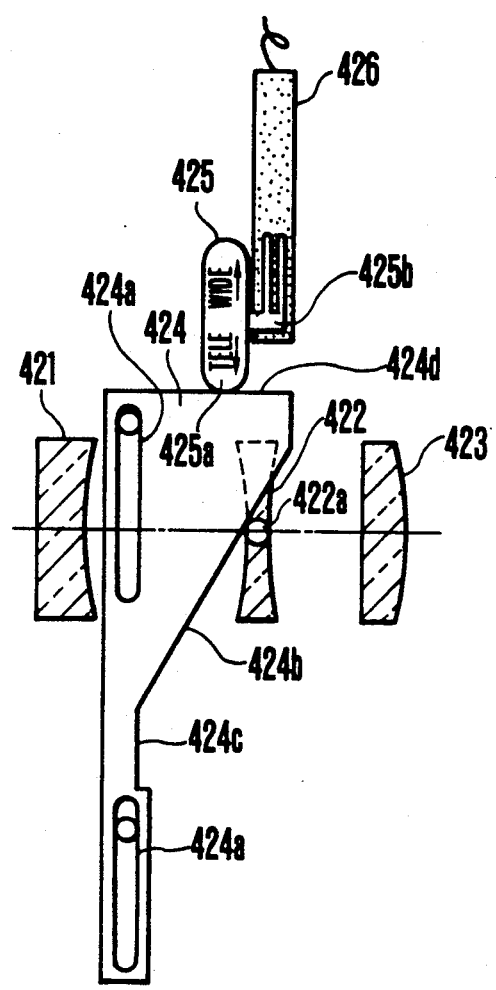
FIG.16
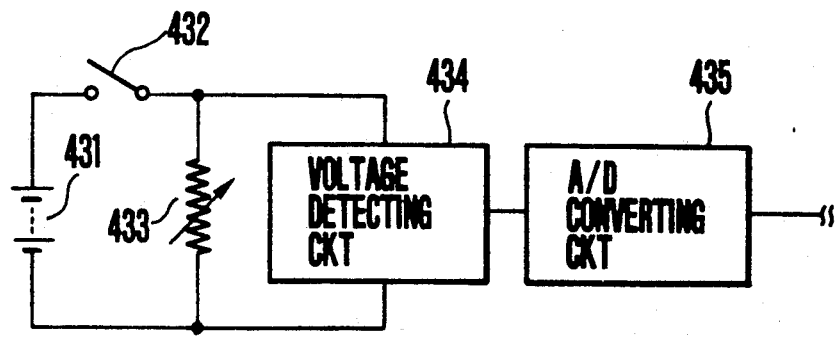

MAGNIFICATION CHANGE-OVER DEVICE FOR A CAMERA

This is a continuation application of Ser. No. 07/453,056, filed Dec. 13, 1989; which in turn is a continuation application of Ser. No. 07/296,928, filed Jan. 11, 1989; which in turn is a continuation application of Ser. No. 07/125,734, filed Nov. 30, 1987; and which in turn is a continuation application of Ser. No. 06/862,798, filed May 13, 1986, all abandoned.

BACKGROUND OF THE INVENTION

1. Field of the Invention

This invention relates to a magnification change-over device adapted for a camera having a photo-taking lens and a viewfinder arranged independently of each other.

2. Description of the Related Art

Cameras of the kind having the magnification thereof variable by means of a zoom lens or the like have been known.

The cameras of this kind include a type called a single-lens reflex camera which is arranged to form a viewfinder optical system by using the optical path of a photo-taking optical system. In the case of the single-lens reflex camera, the magnification of the viewfinder automatically changes when that of the photo-taking lens is changed. Whereas, in the case of a camera of another type having the viewfinder optical system arranged completely independent of the photo-taking optical system, the magnification of the viewfinder cannot be changed by merely changing that of the photo-taking lens. In the event of the camera of this type, therefore, the camera must be provided with some interlock device for causing the magnification of the viewfinder to change according to a change in the magnification of the photo-taking lens.

However, in accordance with the arrangement of the conventional interlock device which is provided for the above-stated purpose, the magnification of the photo-taking lens comes to change every time the magnification of the viewfinder is changed during the process of composing a picture. Therefore, in case that a photographing operation is stopped halfway in the process of selecting a picture composition, the camera must be brought back to a stowed state by shifting the photo-taking lens to its initial position. This is a troublesome operation. In addition to this, in case where the photo-taking lens is arranged to have its magnification shifted by means of a motor, the loss of energy for the operation has presented another problem.

SUMMARY OF THE INVENTION

This invention is directed to the solution of the above-stated problems of the prior art device. It is therefore an object of this invention to provide a magnification change-over device which is advantageously adapted for a camera of the type having a photo-taking lens and a viewfinder arranged independently of each other. To attain this object, a magnification change-over device which is adapted according to this invention for a camera of the type having the photo-taking lens and a viewfinder arranged independently of each other comprises a photo-taking lens having an image magnification which is variable; a viewfinder having an image magnification which is also variable; operating means for varying a image magnification of the viewfinder; detecting means for detecting the magnifying state of the viewfinder; and driving means for driving the photo-taking lens according to the detection signal of the detecting means in taking a photograph. The device is thus arranged such that, after a magnification setting operation on the viewfinder, the magnification of the photo-taking lens is changed according to the set magnification of the viewfinder when a photo-taking operation is actually performed. While the image magnification of the viewfinder which must be changed for the camera operator whenever the magnification of the camera is to be changed from one value to another is thus arranged to be always shiftable, that of the photo-taking lens is arranged to be shiftable only when a photo-taking operation is to be actually carried out. Therefore, in changing the magnification of the camera, the magnification change-over device arranged according to this invention effectively obviates any unnecessary operation on the camera. Therefore, the device is highly suited for a camera of the type having the photo-taking lens and the viewfinder arranged independently of each other.

It is another object of this invention to provide magnification change-over device for a camera whereby the conventional complex arrangement in which change-over guide means, such as cam grooves, is separately arranged for change-over of the magnification of the photo-taking lens, and focus adjustment can be simplified according to this invention by continuously and alternately arranging the guide means, such as a cam groove, for guiding change-over of the magnification of the photo-taking lens and a cam groove for focus adjustment. In accordance with the arrangement of the change-over device embodying this invention, the cam groove for magnification change-over and the cam groove for focus adjustment are continuous from each other. In adjusting the focus, the photo-taking lens moves out of a region provided for magnification change-over and comes into a region for focus adjustment. Therefore, the magnification of the photo-taking lens which obtains when the focus adjustment is performed is always at a magnification value of a boundary part between the magnification change-over region and the focus adjustment region. With the magnification change-over action and the focus adjustment action thus arranged to be alternately performed, the photo-taking lens has its magnification non-continuously shifted. With this arrangement applied to the camera of the type having the photo-taking lens and the viewfinder arranged independently of each other, the magnification of the viewfinder is continuously variable to cause no inconvenience to the camera operator while the photo-taking lens has a magnification value which is the nearest to a magnification value selected through the viewfinder. In this instance, there may arise some difference between the magnification of the viewfinder and that of the photo-taking lens. However, the difference is so small that it brings about no problem for actual photographing. The invented arrangement thus makes both the simplification of the device and improvement in the operability of the camera compatible with each other.

These and further objects and features of this invention will become apparent from the following detailed description preferred embodiments thereof taken in connection with the accompanying drawings.

BRIEF DESCRIPTION OF THE DRAWINGS

In the accompanying drawings, FIG. 1 to FIG. 11 show a first embodiment of this invention. Of these drawings, FIGS. 1 to 4 are sectional views showing the viewfinder part and the photo-taking lens part of a camera embodying this invention.

FIG. 1 shows them as in a state of having the viewfinder part shifted into a wide angle state.

FIG. 2 shows the photo-taking lens as in a state of having been drawn outward according to the state of the viewfinder part of FIG. 1.

FIG. 3 shows the viewfinder as in a state of having been shifted to a telephoto state.

FIG. 4 shows the photo-taking lens as in a state of having been drawn outward according to the state of the viewfinder of FIG. 3.

FIGS. 5 and 6 are front views showing the photo-taking lens part as in the states of FIGS. 1 and 3, respectively.

FIG. 7 is a flow chart showing, stepwise, the operation of the first embodiment.

FIG. 8 is a schematic view showing the arrangement of a photo-taking lens unit which has its focal length arranged to be continuously variable.

FIG. 9 is a sectional view showing another example of an arrangement of the viewfinder magnification shifting device.

FIG. 10 is a schematic view showing an electrostriction lens.

FIG. 11 is a diagram showing the circuits of this embodiment.

FIGS. 12 to 16 show a second embodiment of this invention. Of these drawings, FIG. 12 schematically shows the operating principle of a photo-taking lens arranged according to this invention.

FIG. 13 schematically shows the movement of a photo-taking lens arranged on the operating principle shown in FIG. 12.

FIG. 14(b) shows the same device in a state of having been shifted from a wide angle position to a telephoto position.

FIG. 15(a) shows the details of a viewfinder of FIG. 14(a).

FIG. 15(b) shows the details of the viewfinder shown in FIG. 14(b).

FIG. 16 shows the details of a zooming signal processing circuit of FIG. 14(a).

DETAILED DESCRIPTION OF THE PREFERRED EMBODIMENTS

Figure 1:
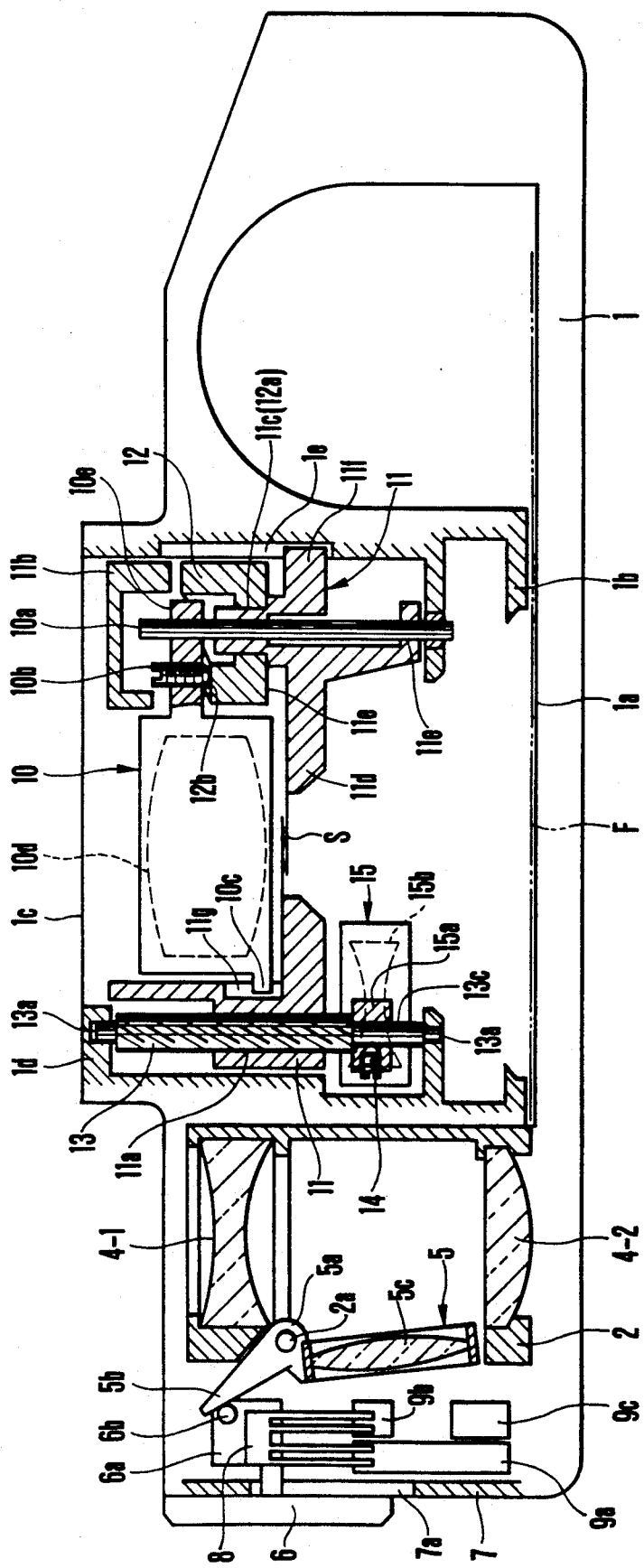
Figure 2:
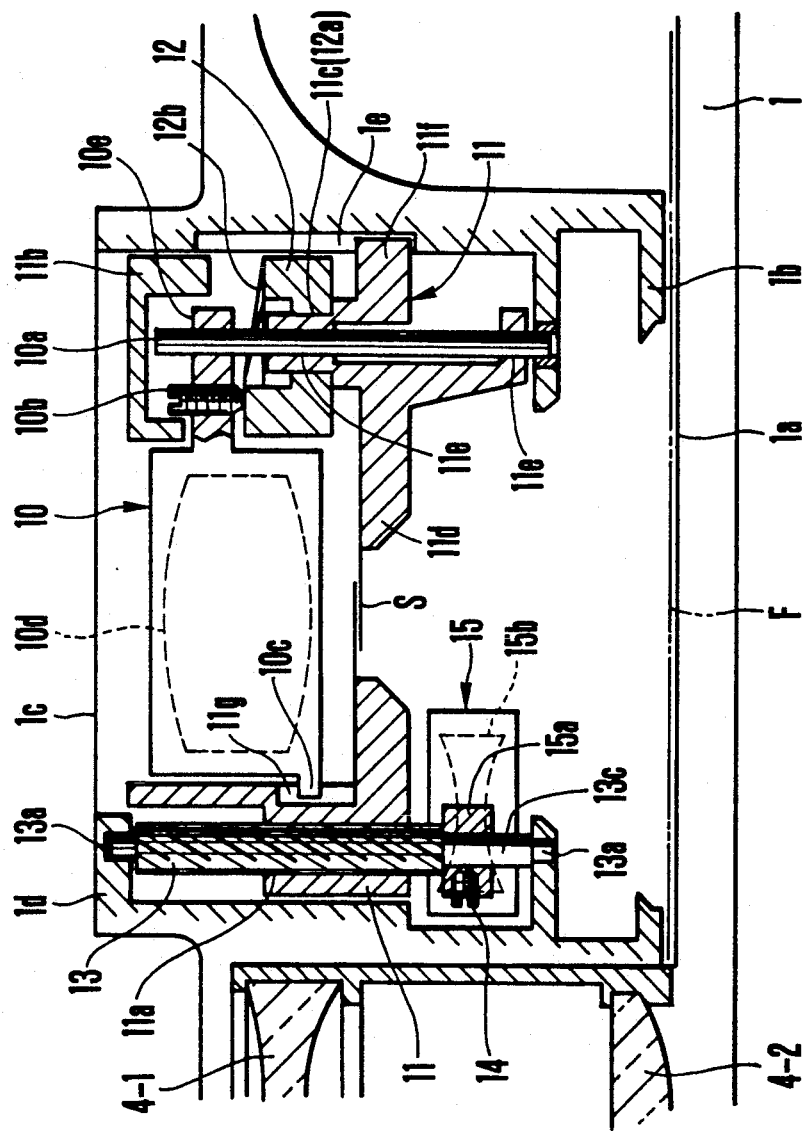
Figure 3:
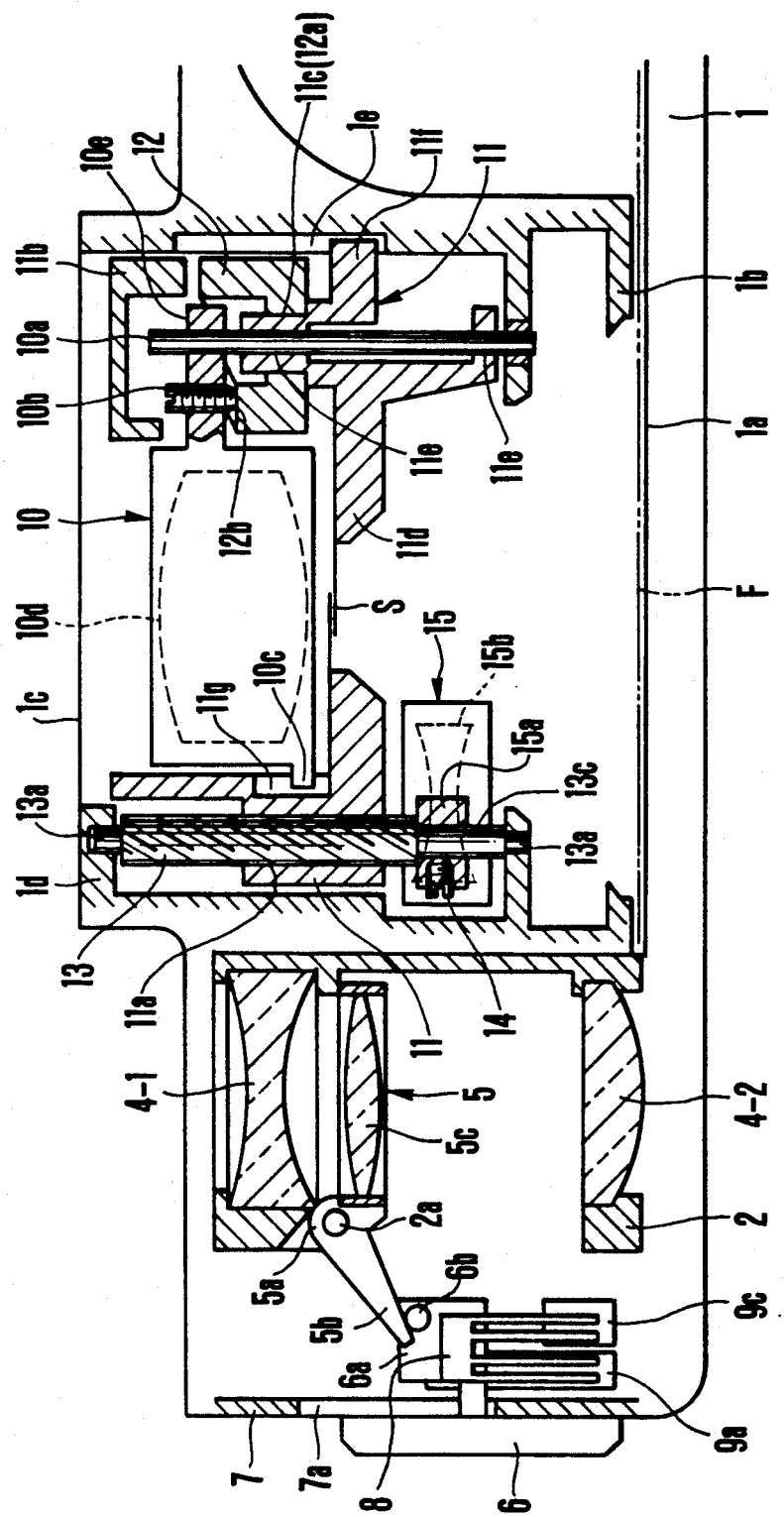
Figure 4:
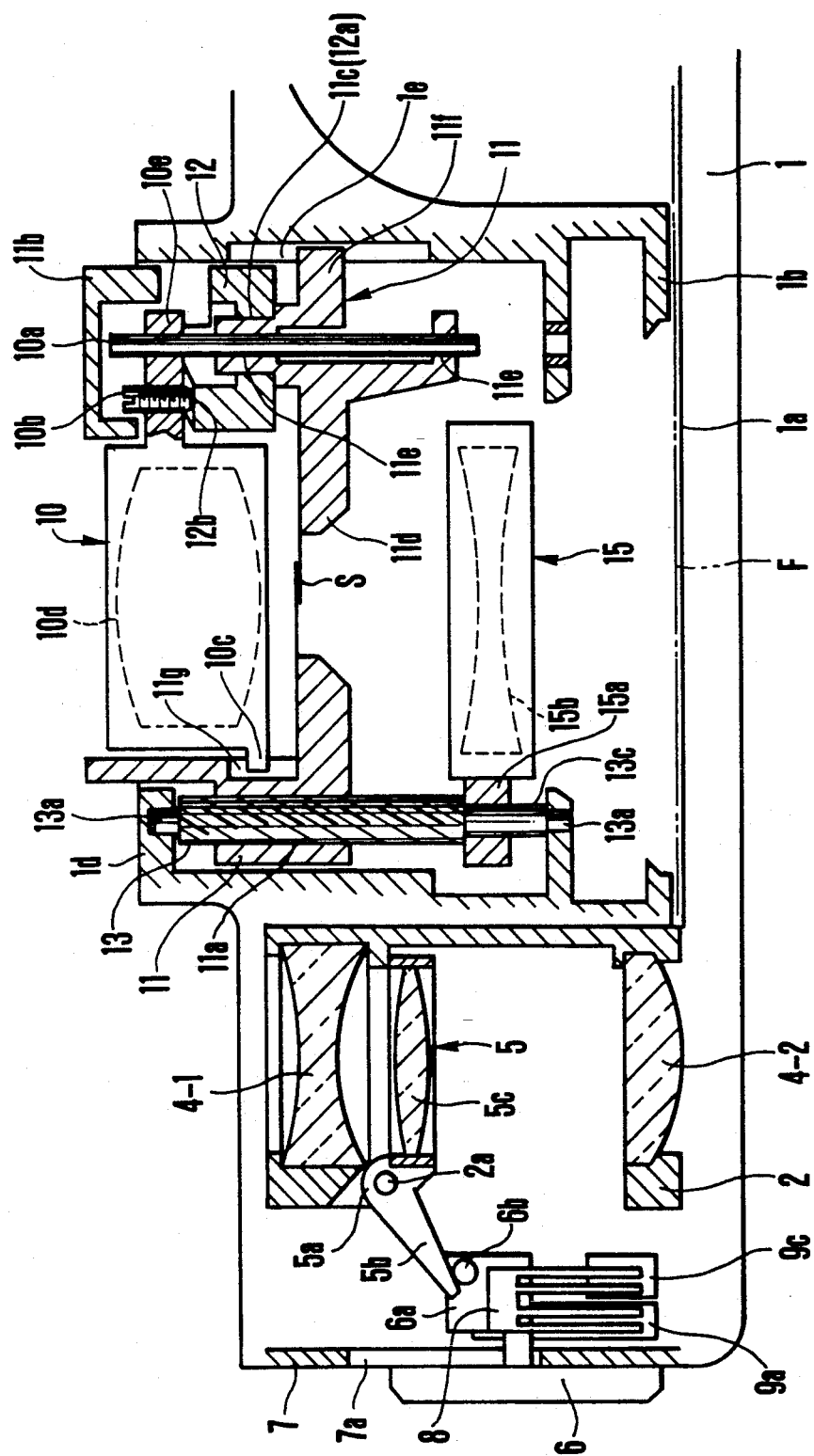

FIGS. 1 to 11 show a first embodiment of this invention. Among these drawings, FIGS. 1 to 4 show, in sectional views, the viewfinder part and the photo-taking lens part of a camera embodying this invention. In FIG. 1, the viewfinder is shown in a state of having been shifted to a wide angle position. In FIG. 2, the photo-taking lens is shown in a state of having shifted its position according to the state of the viewfinder shown in FIG. 1 when a photo-taking operation is to be performed. FIG. 3 shows the viewfinder in a state of having been shifted to a telephoto position. FIG. 4 shows the photo-taking lens as in a state of having shifted its position according to the state of the viewfinder shown in FIG. 3.

Referring to FIG. 1, a camera body, which is indicated with a single line for the sake of simplification of the illustration, includes a back lid cover, etc. More specifically, the camera body 1 is provided with a film plane 1a; an aperture determining light blocking part 1b; a styled front part 1c; a guide part 1d which engages a helicoidal bar 13; a key 1e which is provided for zooming or for urging a focus shifting zoom frame 11 to move straight; and so on.

A viewfinder block 2 is formed in one body with the camera body 1. The block 2 is provided with a shaft 2a which is in fitting engagement with holder part 5a of a change-over lens unit 5 and is arranged to guide the latter. The shaft 2a is further arranged to carry an objective lens 4-1 and an eye piece 4-2.

The change-over lens unit 5 consists of a lens part 5c and a change-over part 5b and is urged to move by a spring, which is not shown, in the counterclockwise direction as viewed on the drawing. A magnification change-over knob 6 is arranged to cover the slot 7a of an external cover part 7 and to be vertically slidable as viewed on the drawing. The knob 6 is provided with a tongue part 6a which is located inside the camera. The tongue part 6a is formed in one unified body with an electric contact piece 8 and a pin 6b which abuts on the above-stated change-over part 5b of the change-over lens unit 5. Patterns 9a, 9b and 9c are formed on a substrate which is not shown. The pattern 9a is ground part. The pattern 9b is connected to a WIDE control terminal of a logic control IC (hereinafter referred to as IC for short) which will be described later herein. The pattern 9c is connected to a TELE control terminal of the IC. The above-stated contact piece 8 is arranged to slide over the patterns, accordingly, as the magnification change-over knob 6 is operated and thus to transmit a signal representative of the position of the knob 6 to the IC.

A photo-taking lens unit 10 is provided with an arm 10e. A guide bar 10a is secured to the arm 10e and is slidably fitted into the camera body 1. A guide key 10c, which is provided on the opposite side of the lens unit 10, engages a key way 11g and is arranged to be movable only in the vertical direction. The lens unit 10 is urged to move downward as viewed in the drawing by a spring, which is not shown, but is stopped at a point where a focus adjustment screw 10b screwed into the arm 10e is abutting on a cam part 12b of a distance adjustment ring 12. At an adjustment stage during assembly work, the position of the photo-taking lens 10d relative to the film plane or surface 1a is adjustable by turning the focus adjustment screw 10b.

A zoom frame 11 forms a lens barrel base plate unit. A female helicoidal face 11a of the zoom frame 11 engages a helicoidal bar 13 on the left-hand side relative to the optical axis of the photo-taking lens as viewed in the drawing. On the right-hand side of the zoom frame 11, a key part 11f of the frame 11 engages a key way 1e provided in the body 1. The frame 11 is thus arranged to move up and down straight as viewed in the drawing, accordingly, as the helicoidal bar 13 turns round. The zoom frame 11 is provided with a shaft part 11c which carries a lid part 11b and the distance adjustment ring 12; a shutter part 11d; two guide parts 11e which are arranged to engage the guide bar 10a of the lens barrel unit 10; and the above-stated key way 11g. The distance adjustment ring 12 is provided with a hole 12a which is fitted on the shaft part 11c of the zoom frame 11. The ring 12 is thus rotatably carried by the shaft part 11c and is arranged to have its cam part 12b abut on the focus adjustment screw 10b of the lens barrel unit 10. Claw parts 12c to 12j are formed along the periphery of the ring 12 as shown in FIG. 5.

The above-stated helicoidal bar 13 is rotatably carried by the camera body 1 at its upper and lower ends 13a. The bar part 13c of the bar 13 has a guide part 15a of a rear lens unit 15 attached thereto by means of a screw 14. The guide part 15a is thus arranged to turn round in one body with the helicoidal bar 13. A reference numeral 15 denotes a rear lens which is a concave lens FIG. 5 shows the photo-taking lens part with associated parts as viewed from the front side of the camera while they are in the state as shown in FIG. 1 or 3. A stop pawl 16 is pivotally carried by the zoom frame 11 of FIG. 1. A spring 18 urges the pawl 16 to move clockwise. This causes the claw part 16c of the stop pawl 16 to engage the claw part 12c of the distance adjustment ring 12. An armature part 16b, which is disposed on the opposite side of the pawl, is formed in one body with the claw part 16c and is opposed to an attraction or suction type magnet 17.

A relay gear 19 is rotatably connected by a shaft 19a to the zoom frame 11. A small gear part 19b of the relay gear 19 engages the gear part 21b of a charge gear 21. A large gear part 19c of the relay gear 19 engages the gear part 12k (see FIG. 6) of the distance adjustment ring 12. An electrical contact piece 20 is attached to the relay gear 19 in one unified body with the gear. The contact piece 20 slides over a printed board, which is not shown, accordingly, as the distance adjustment ring 12 rotates. The contact piece 20 is thus arranged to give information on the shifted position of the photo-taking lens to the IC. A charge gear 21 is rotatably carried by the zoom frame 11 through a shaft 21a and is provided with a charge part 21c. A spring 22 urges the charge gear 21 to move counterclockwise. However, in the case of FIG. 5, the gear 21 is kept in a charging state with the claw part 16c of the stop pawl 16 engaging the claw part 12c of the distance adjustment ring 12.

A rear lens charge lever 23 is provided with a gear part 23b which engages the gear part 15d of the above-stated rear lens unit 15. The shaft 23a of the rear lens charge lever 23 is rotatably carried by the camera body 1. The charge pin 23c of the charge lever 23 abuts on the charge part 30c of a charge rack 30 which will be described later. A spring 24 urges the lever 23 counterclockwise as viewed in the drawing.

A W-shaped carrying pawl 25 is pivotally attached to the body 1. A claw part 25b, which is formed at one end of the pawl 25, engages a claw part 15c which is formed in one body with the guide part 15a of the rear lens unit 15. An armature part 25c, which is arranged to be attracted by a magnet 27, is formed at the other end of the pawl 25. A spring 26 urges the pawl 25 to move clockwise. However, the clockwise turn of the pawl 25 is stopped at the position of FIG. 5 by a stopper which is not shown.

A manual operation knob 28 is slidably carried by the body 1 and is slidable to the left and right as viewed in the drawing. A spring 29 urges the knob 28 to move to the right. However, the rightward movement of the knob 28 is stopped at the position of FIG. 5 by a stopper which is not shown.

When the photographer pushes the manual operation knob 28 from the outside of the camera to the left as viewed in the drawing, the right end part 28a of the knob 28 pushes the armature part of the W-shaped carrying pawl 25. This disengages the claw part 25b from the claw part 15c of the rear lens unit 15. Then, the rear lens or concave lens 15b of the rear lens unit 15 can be manually inserted into the photo-taking optical path of the camera. At the same time, the helicoidal pin 13 is rotated so that the zoom frame 11 can be moved forward to a position as shown in FIG. 4.

A charge rack 30 is provided with slots 30a which are fitted on guide pins 40. The pins 40 thus slidably carry the rack 30 to permit it to slide to the left and right directions as viewed in the drawing. A spring 31 urges the rack 30 to move to the left. However, the rack is stopped at the position as shown in FIG. 5 by a stopper which is not shown. The charge rack 30 is provided further with arm parts 30b and 30c. During the charging movement of the charge rack 30 in the rightward direction, the arm part 30b abuts on the charge part 21c of the above-stated charge gear 21 and the other arm part 30c on the charge part 23c of the rear lens charge lever 23. A rack part 30d is formed on one side of the rack 30 opposite to the arm part 30c and is arranged to engage a gear part 32b of a segment gear 32 during a charging process. The segment gear 32 is pivotally carried by the body 1 via a shaft 32a and is arranged to be rotatable by a driving device which is not shown. For example, when a motor is rotated by a known motor driving device, the segment gear 32 makes one turn to charge thereby the charge rack 30 and, after that, comes back to the state as shown in FIG. 5. Since this arrangement is obvious to a person skilled in the art, the details of it is omitted from the description here. The embodiment which is arranged as described above operates in the following manner:

With the camera in the state as shown in FIG. 1, when the photographer pulls the change-over knob 6 to a position as shown in FIG. 3 for the purpose of changing the magnification of the camera while watching the inside of the viewfinder, the tongue part 6a and the pin 6b also move together with the knob. Then, the change-over lens unit 5 is caused to turn round counterclockwise by the force of the spring which is not shown. The lens 5c enters the inside of the viewfinder to change the magnification of the view finder from a wide angle state over to a telephoto state. Since this change-over is effected by just moving the knob 6 and the change-over unit 5, the operation, unlike the conventional zoom lens, does not give any heavy feeling. Therefore, the excellent operability of the embodiment enables the photographer to freely compose a picture by varying the magnification of the viewfinder between the wide angle state and the telephoto state while watching the viewfinder. Following this, when the photographer pushes a shutter release button to a first stroke point thereof, preliminary distance and light measurement is accomplished and information on the distance and brightness of an object to be photographed is displayed within the viewfinder.

Figure 6:
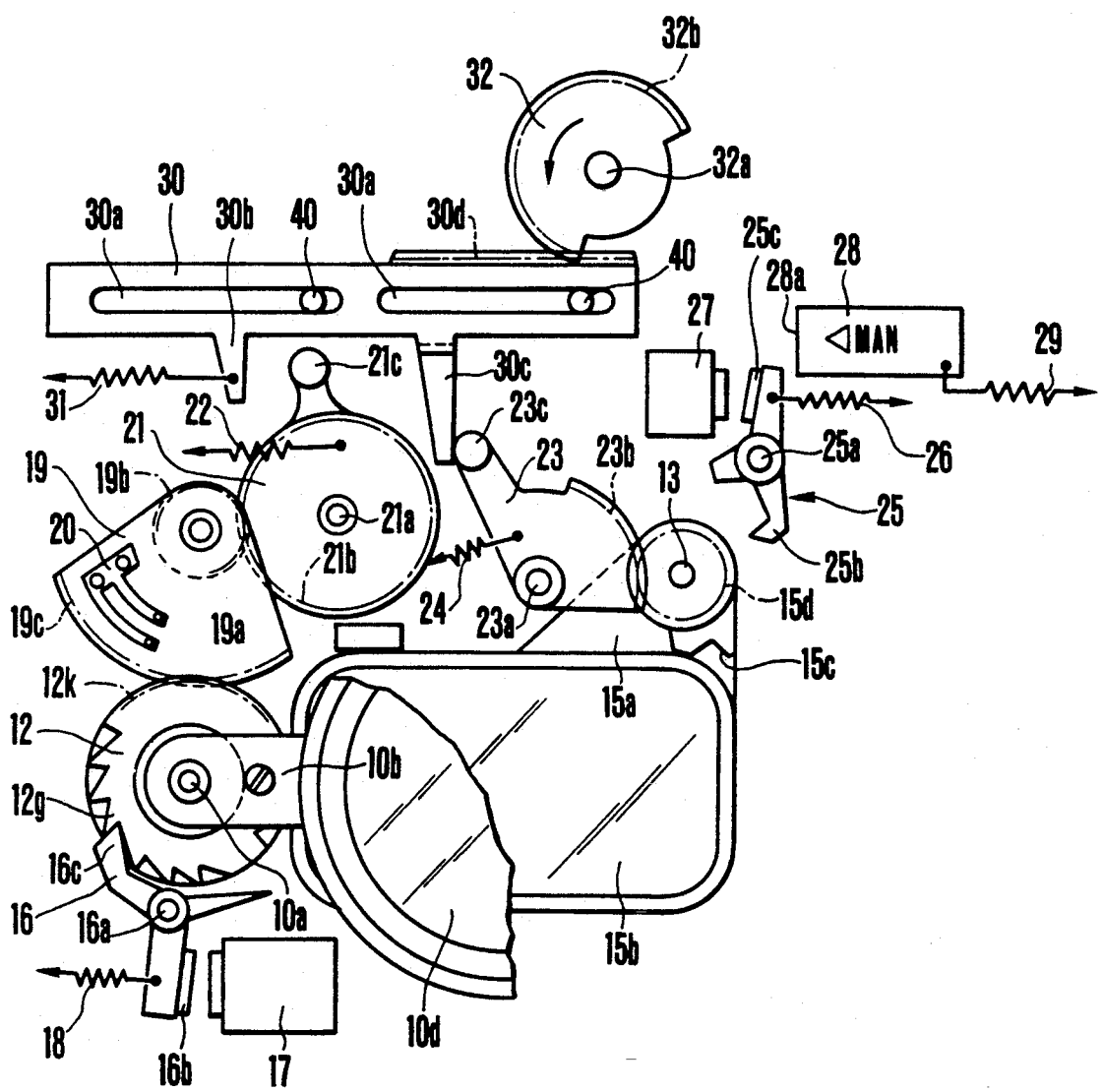

When the release button is pushed further to a second stroke point thereof, the camera performs a photo-taking operation. In this instance, the power supply of the IC is first latched. Next, the voltage levels of the TELE and WIDE control terminals 9b and 9c are detected to find whether the change-over knob 6 and the change-over lens unit 5 are in the telephoto state or in the wide angle state. If the magnification change-over or selection knob 6 is in a position on the wide angle side thereof, i.e., if the viewfinder is in the wide angle state as shown in FIGS. 1 and 5, a distance adjusting action immediately begins. In case that the knob 6 is on the telephoto side as shown in FIG. 3, the terminals 9c and 9a are shortcircuited by the contact piece 8 and the level of the TELE terminal of the IC changes to a low level. This causes the IC to energize the magnet 27. The magnet 27 attracts the W-shaped carrying pawl 25. The claw part 25b of the pawl 25 then disengages from the claw part 15c of the rear lens unit 15. The rear lens charge lever 23 is then caused by the force of the spring 24 to turn round from the position of FIG. 5 to a position thereof as shown in FIG. 6. This brings the rear lens unit 15 into its position as shown in FIGS. 4 and 6. At the same time, the lens barrel unit 10 moves forward as shown in FIG. 4.

During, or before or after, the above-stated operation, the magnet 17 is energized to attract the stop pawl 16. This disengages the claw part 16c of the pawl 16 from the claw part 12c. With the claw part 12c disengaged, the distance adjustment ring 12 is caused to turn round counterclockwise as viewed on FIG. 5 by the force of the spring 22 which is urging the charge gear 21 interlocked with the ring 12 via gears 12k, 19c, 19b and 21a. The cam part 12b of the ring 12 then moves the lens barrel 10 forward as shown in FIG. 4.

Information on the extent to which the lens barrel 10 is thus moved forward is obtained with the contact piece 20 which is disposed on the relay gear 19 sliding over the pattern (not shown) and is transmitted to the IC. This information is compared with stored information on the result of preliminary distance measurement. When the lens barrel 10 comes to an in-focus position, the magnet 17 is demagnetized. The claw part 16c of the stop pawl 16 then plunges into an apposite point among the claw parts 12d to 12f of the distance adjustment ring 12. This brings to an end an automatic adjusting action on the photo-taking lens 10d.

Following this, when a photographing completion signal is produced upon completion of an exposure effecting operation which is accomplished in a known manner, one frame portion of the film is taken up by known film winding means. At the same time, the segment gear 32 makes one turn from the state of FIG. 6 in the direction of arrow. The charge rack 30 is charged in the rightward direction. The arm parts 30b and 30c then respectively charge the charge gear 21 and the rear lens charge lever 23 in the clockwise direction as viewed on FIG. 6. Then, when the state of FIG. 5 is resumed, the cut-away part of the segment gear 32 comes to the rack part 30d of the rack 30. The force of the spring 31 brings the charge rack 30 to a stop in the state of FIG. 5.

When the magnification change-over lever 6 is on the wide angle side, as shown in FIG. 1, the rear lens unit 15 and the magnet 27 are not operated. However, with the exception of that, the rest of operation is performed in the same manner as the operation described in the foregoing. Upon completion of the focus adjusting action, the photo-taking lens 10d is in a state of having been drawn forward as shown in FIG. 2.

Figure 7:
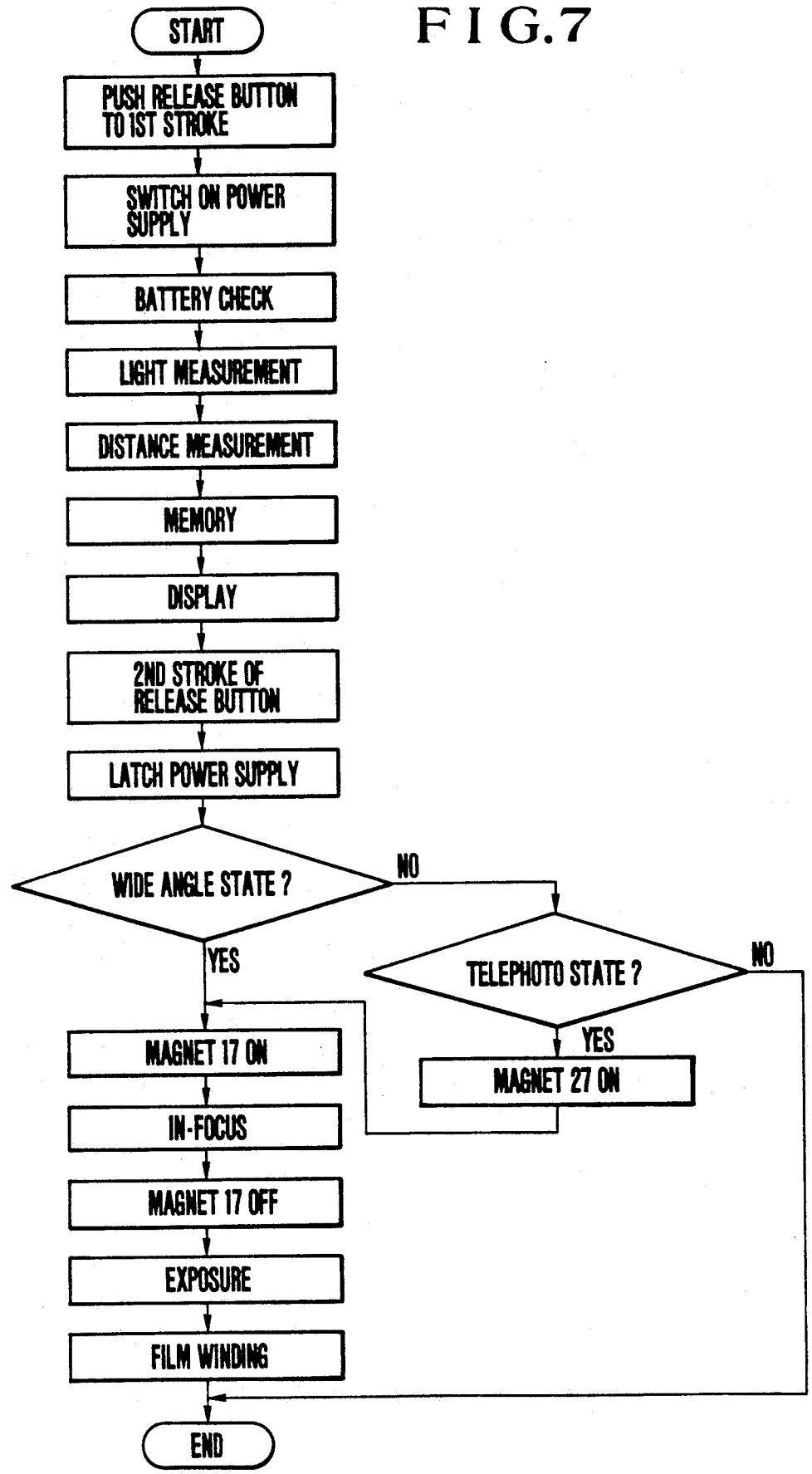

FIG. 7 shows the above-stated operation in a stepwise sequence.

In the event of use of the camera on the telephoto side thereof under such a condition that allows absolutely no vibrations as in the case of photomicrography, the manual operation knob 28 is operated to the left as viewed on FIG. 5 before the photographing operation. Then, the end face 28a of the knob 28 pushes the W-shaped carrying pawl 25 to cause it to turn counterclockwise, so that the photo-taking lens system can be manually set into a telephoto state.

In the case of the arrangement described above, only two different focal lengths are arranged to be changed from one over to the other. However, this invention is effectively applicable also to a zoom lens which is arranged to have a greater number of different focal lengths selectable either stepwise or in a continuous manner.

One example of such arrangement is as shown in FIG. 8. Referring to FIG. 8, a front lens group unit 101 is carried by a female helicoidal part 101a in such a way as to be movable upward and downward as viewed on the drawing. The lens unit 101 is provided with a lens unit 101b and a key 101c. A rear lens group unit 102 is carried by a female helicoidal part 102a and is provided with a lens unit 102b and a key 102c. A helicoidal bar 103 which corresponds to the helicoidal bar 13 of the preceding example is rotatably carried by the camera body through a shaft part 103a. The bar 103 consists of helicoidal parts 103b and 103c which differ from each other in the pitch of helicoid and are oppositely threaded, one to the left and the other to the right. The arrangement is such that, when the helicoidal bar 103 rotates in a given direction, the magnification of the lens system changes with the front lens group unit 101 moving forward while the rear lens group unit 102 is moving backward. The bar 103 is provided with a claw part 103d which engages the claw part 104a of a stop pawl 104. The claw part 103d consists of claws which are arranged along the circumference of the part 103d to determine different values of magnification. A spring urges the claw part 103d to turn round.

The stop pawl 104 is rotatably carried. A spring is arranged to urge the pawl 104 to move in the direction of engaging the claw part 103d. The pawl 104 is provided with an armature part 104b. When a magnet 105 is energized by the IC which is not shown, the claw part 104a is disengaged from the claw part 103d while the magnet is receiving a power supply. The magnification is thus arranged to be shiftable from one value to another while the magnet is energized.

With the embodiment arranged in the above-stated manner, the front and rear lens group units are driven with the helicoidal bar. Therefore, the lens can be very accurately positioned within a limited space. A high degree of precision is required only for the front lens group and rear lens group units 101 and 102 and the helicoidal bar 103 in having the lens positioned highly accurately through the complex movement of these parts. It is another advantage of this embodiment that a shutter unit can be compactly arranged as the space required for piercing the shutter unit does not exceed the thickness of the thin helicoidal bar 103.

Further, the use of this helicoidal bar also readily permits a known flashmatic device or a front lens group driving device to be disposed behind the shutter.

FIG. 9 shows another example of arrangement of the viewfinder magnification change-over device. The illustration includes a moving lens unit 111 for the viewfinder. The lens unit 111 is arranged to be movable up and down, as viewed in the drawing, by some external operation member such as the knob 6 of FIG. 1. An electrical contact piece 111a is secured to the lens unit and is arranged to be slidable over a pattern 113. The contact piece 111a thus transmits information to the IC about the magnification value (or focal length) being selected at the view finder. A reference numeral 112 denotes a fixed lens. Since the photographer is required only to move the viewfinder optical system in relation to the object, the embodiment also excels in operability. Meanwhile, the photo-taking lens system can be always kept in a compact state with the exception of a brief period of time for photographing. The embodiment thus can be readily stowed. It also has the energy saving advantage and excels in light shielding capability in the same manner as the preceding example of embodiment.

Figure 10:
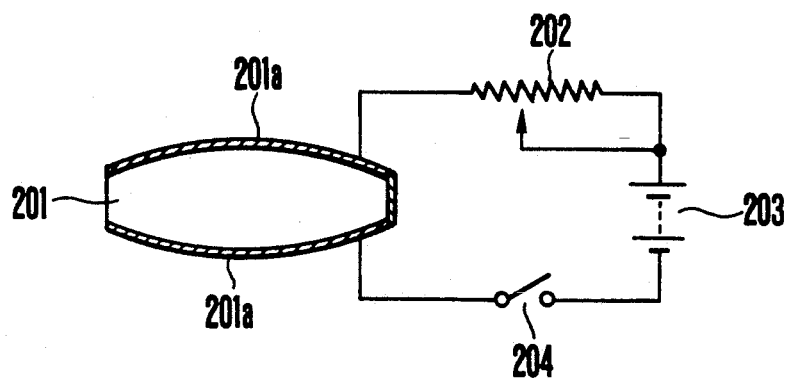

FIG. 10 shows a further example wherein an electrostriction lens 201 is employed in place of the photo-taking lens unit of FIG. 8. The lens 201 is made of such a material ($LiNbO_3$ or the like) that has its refractive index variable with a voltage applied between electrode parts 201a and 201b provided on both sides of the lens. For example, a variable resistor 202 is arranged to vary its resistance value according as the magnification of the viewfinder is adjusted by means of the change-over knob mentioned in the foregoing. This arrangement of the variable resistor in combination with the electrostriction lens 201 permits continuous zooming. The illustration of FIG. 10 includes a power supply 203 and a switch 204 which is arranged to be responsive to a shutter release operation and thus to have a power supply only when a photo-taking operation is actually performed. Therefore, this embodiment also excels in giving an energy saving effect.

Figure 11:
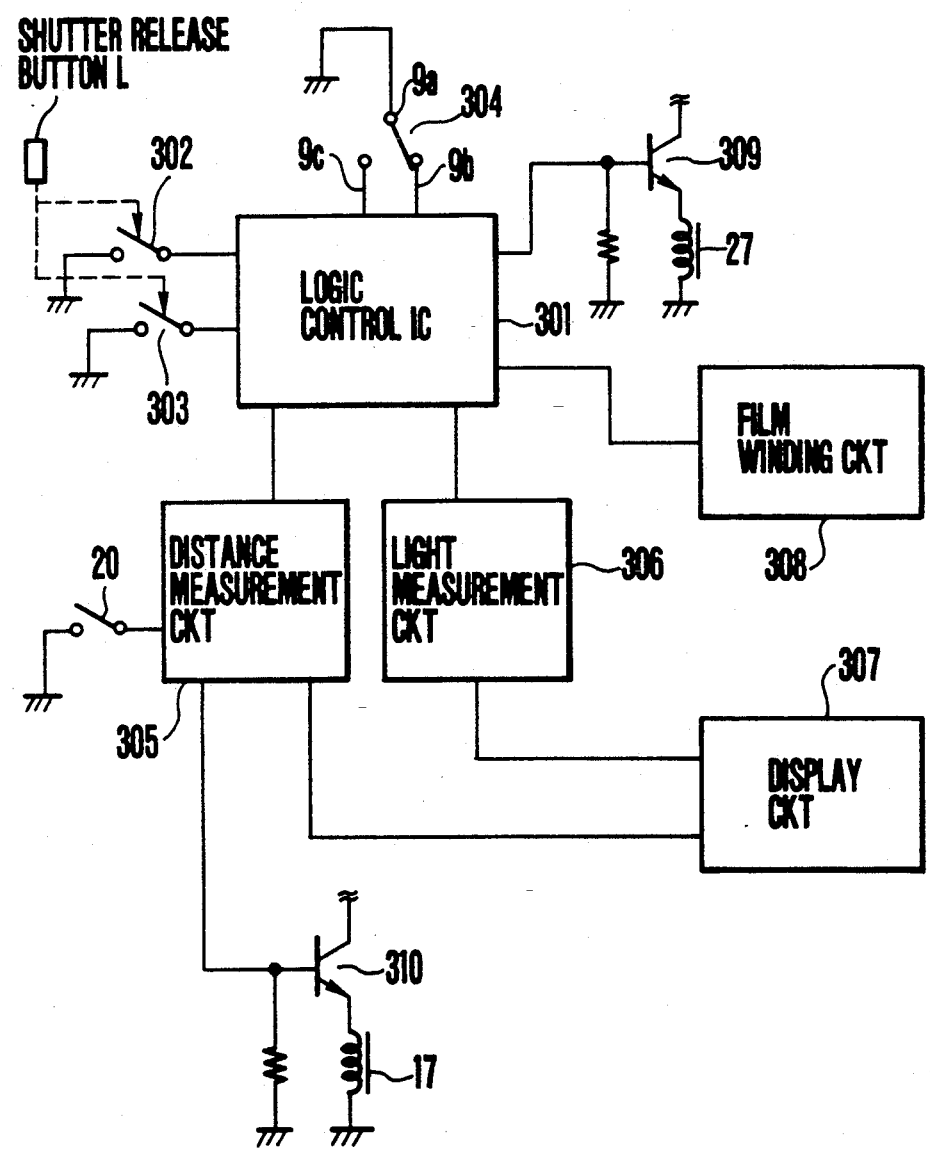

This invention is not limited to the specific embodiment given in the foregoing but may be variously changed and modified without departing from the spirit and scope thereof. FIG. 11 shows the circuit arrangement of a camera including the arrangement described in the foregoing. Referring now to the flowchart of FIG. 7 in conjunction with the circuit diagram of FIG. 11, the camera operates as follows:

When a shutter release button L is pushed to its first stroke by the photographer for initiating a photographing operation, a power supply switch 302 for the circuit is closed. A power supply is then effected to a logic control IC 301 which is composed of a micro-computer, etc. Then, power supply voltage is checked (a known battery check operation). A light measurement circuit 306 performs a light measuring operation. Information on the brightness of the object to be photographed is displayed by a display circuit 307. A distance measurement circuit 305 measures a distance to the object in a known manner. Information on the distance measurement is stored at a memory part 305-1 which is disposed within the distance measurement circuit 305. At the same time, the information on the object distance is produced from the circuit 305 and is displayed by the display circuit 307. After confirmation of the data thus displayed, when the shutter release button L is further pushed by the photographer to the extent of the second stroke thereof, another switch 303 is closed. The logic control IC 301 then latches a current thus supplied and, at the same time, initiate a photographing operation. First, the voltage levels of the output terminals of the patterns 9b and 9c shown in FIG. 1 are read out. If the level of the pattern 9b is found to be at a low level as shown in FIG. 11, the camera is considered to be in a wide angle state. In this instance, the level of the base terminal of a transistor 309 is kept at a low level to have the transistor 309 in a non-conductive state. In case that the output terminal of the other pattern 9c is found at a low level, the camera is considered to be in a telephoto state. In that instance, the transistor 309 is rendered conductive. Then, the magnet 27 (see FIG. 5) is excited to cause the W-shaped carrying pawl 25 of FIG. 5 to turn round counterclockwise. This brings the rear lens unit 15 into the photo-taking optical path. Concurrently with this, the zoom frame 11 is moved forward as shown in FIG. 4.

Following this, the logic control IC 301 produces and supplies a distance adjustment start signal to the distance measurement circuit 305. Upon receipt of this signal, the distance measurement circuit 305 changes the base voltage of a transistor 310 from a low level to a high level to excite the magnet 17. At the same time, the pulses of a pulse signal representing the ON and OFF actions of the above-stated electrical contact piece 20 are counted by a known count means. The counted value is compared with the above-stated distance measurement information. When the former comes to coincide with the latter, the base voltage of the transistor 310 is changed from the high level to the low level to demagnetize the magnet 17. With the magnet 17 demagnetized, the stop pawl 16 turns round clockwise to plunge into some point among the claw parts 12d to 12j and thus brings a focusing process to an end.

This is followed by known exposure effecting and film winding operations. After completion of these operations, the camera returns to the state of FIG. 5.

Figure 12:
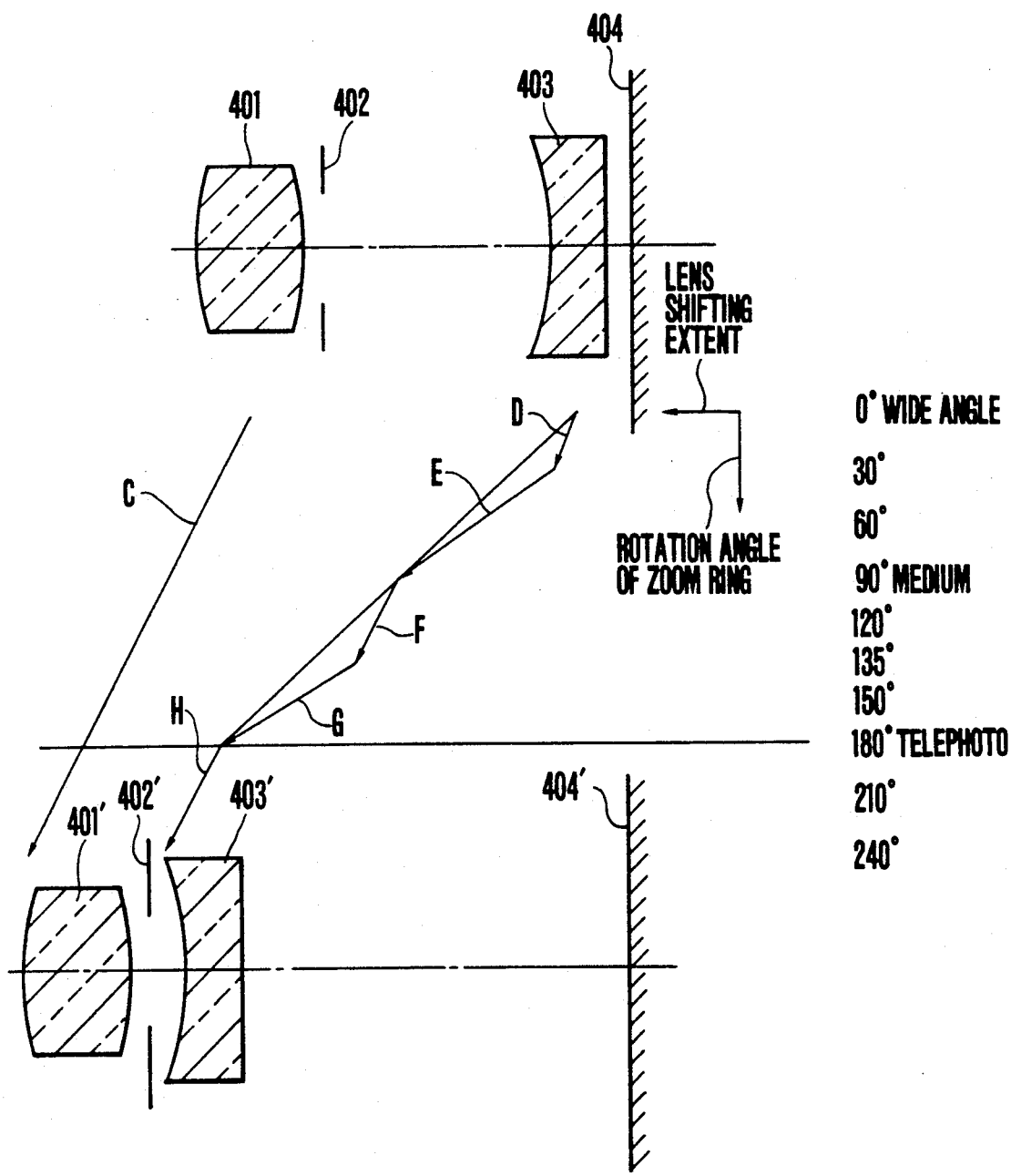

A second embodiment of this invention is arranged as shown in FIGS. 12 to 16. FIG. 12 schematically shows the operating principle of the photo-taking lens system of this embodiment. The illustration includes a convex lens unit 401; shutter blades 402 which serve also as a stop; a concave lens unit 403; and a photo-taking image plane 404. The upper part of the illustration represents a condition in which the lens is in focus on an infinity distance object in a wide angle state. The lower part of the illustration represents a condition in which the lens is in focus on a nearest distance object in its telephoto state. Arrows C to H, shown in between these upper and lower parts, represent the positions of lens units 401 to 403 on the optical axis corresponding to different rotation angles of a zoom ring, which are as shown on the right-hand side of the illustration. More specifically, the intermediate part between the upper and lower parts of the drawing is a graph showing the moving loci of the lens units in arrows C to H with the moving extents of these lens units taken on the axis of abscissa and the rotation degree of a driving ring (the zoom ring) on the axis of ordinate. Although the concave lens unit 403 is shown as making a complex movement, the actual arrangement for this lens unit is quite simple as will be described later.

Again referring to FIG. 12, while the zoom ring is turned round from 0 degree to 30 degrees, the convex lens unit 401, the shutter 402 and the concave lens unit 403 moves together. The magnification remains unchanged from the wide angle state. Under that condition, the focal point alone changes from an infinity distance state to a nearest distance state. In other words, focus adjustment is alone effected during a period indicated by the arrow D.

When the zoom ring is turned round from a point of 30 degrees to a 90 degree point, the magnification changes toward the telephoto side thereof. At the point of 90 degrees, there obtains a magnification value which is intermediate between the wide angle magnification and the telephoto magnification. If the zoom ring is rotated further from the 90 degree point, the whole lens system is again moved forward. Then, the focal point alone changes from an infinity distance point to a nearest distance point in the state of the intermediate magnification. The magnification remains unchanged from the intermediate value obtained at the 90 degree point until the zoom ring reaches a point of 135 degrees (during a period represented by the arrow F).

Following this, when the zoom ring is further rotated from 135 degrees to 180 degrees, the magnification again comes to change and becomes the telephoto state at the point of 180 degrees. Then, when the zoom ring is rotated further from the 180 degree point, the whole photo-taking lens system is moved forward. The focal point then changes from an infinity distance point to a nearest distance point while the zoom ring turns round from the 180 degree point to a 240 degree point. In other words, the focal point is adjustable while the magnification remains unchanged from the telephoto value obtained at the 180 degree point during a period represented by the arrow D. With the lens system arranged in this manner, the magnification non-continuously varies and the focus adjustment comes to be effected at the magnification value obtained prior to or subsequent to the adjustment. However, the arrangement enables the photographer to adjust both the magnification and the focal point by just turning round a single zoom ring.

Figure 13:
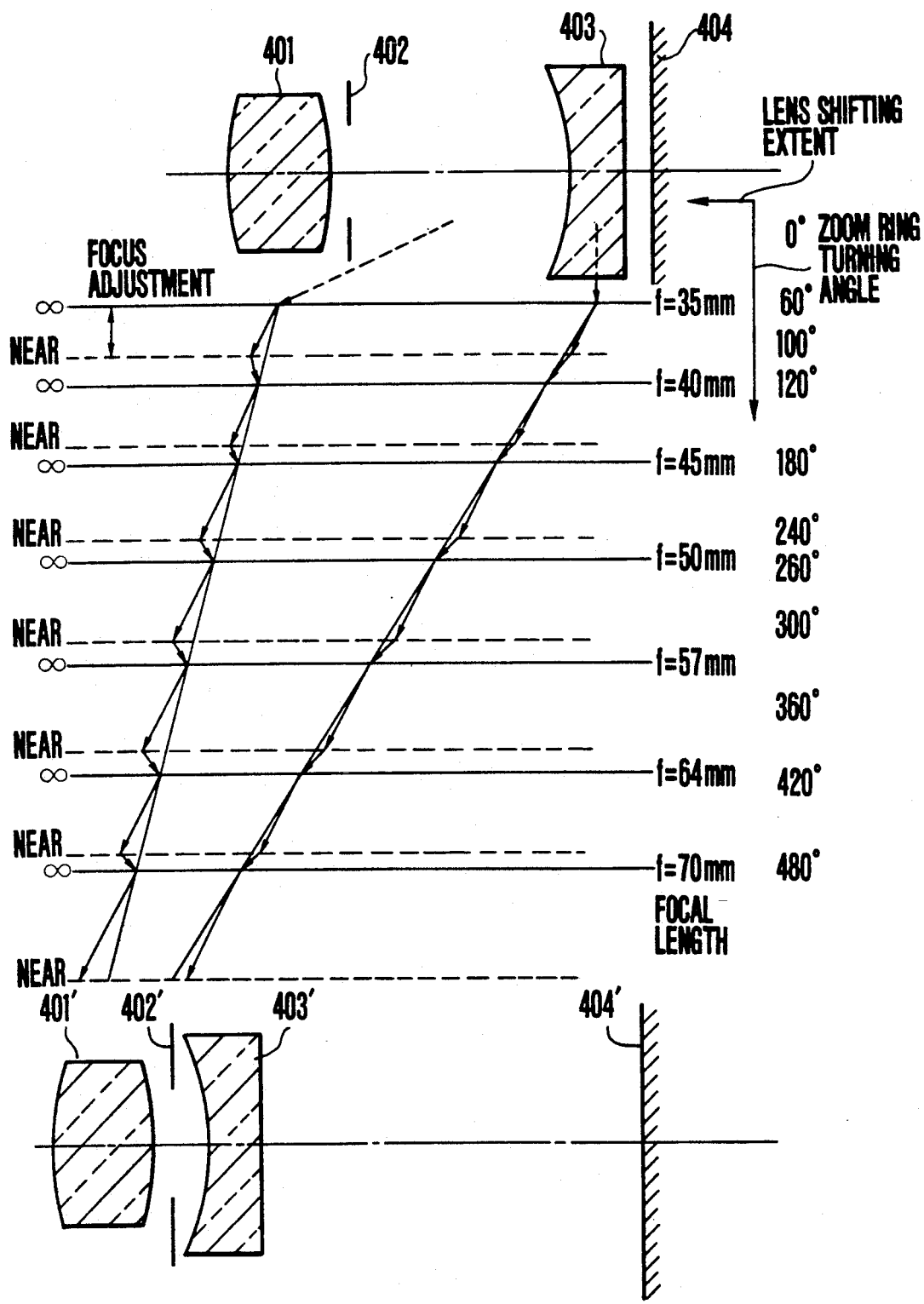

FIG. 13 shows the lens system of a camera arranged on the operating principle of FIG. 12 to have the focal length thereof variable from 35 mm to 70 mm. In this case, the lens is arranged to permit selection of seven focal length points between 35 mm and 70 mm. The arrangement shown in FIG. 13 is identical with the arrangement shown in FIG. 12. Therefore, the following description is limited to the operation of the arrangement: The upper part of FIG. 13 shows the lens system as in a state of having its focal length at 35 mm. In this instance, the zoom ring has been already turned round 60 degrees. At the 0 degree stowing position of the zoom ring, the front convex lens unit 401 is in a retracted state. At the 60 degree position of the zoom ring, the lens is in a infinity distance position at the focal length of 35 mm. When the zoom ring is turned round further from this position, the whole lens system is moved forward. Then, the focal point is adjustable with the focal length remaining unchanged until the zoom ring rotating degree reaches 100°. At each of different focal lengths indicated in the drawing, focus adjustment alone can be effected from an infinity distance to a nearest distance within a part from a full line to a broken line; and then the magnification is changed from one value over to another within another part from the broken line to another full line.

The arrangement of FIG. 13 differs from FIG. 12 which shows the operating principle in the following points: The convex lens unit 401 is also arranged to make non-continuous movement; and the number of change-over points is increased by increasing the rotating angle of the zoom ring. Further, the lens arrangement can be readily modified to permit focus adjustment by moving only the front or rear lens group instead of moving the whole lens system.

Figure 14A:
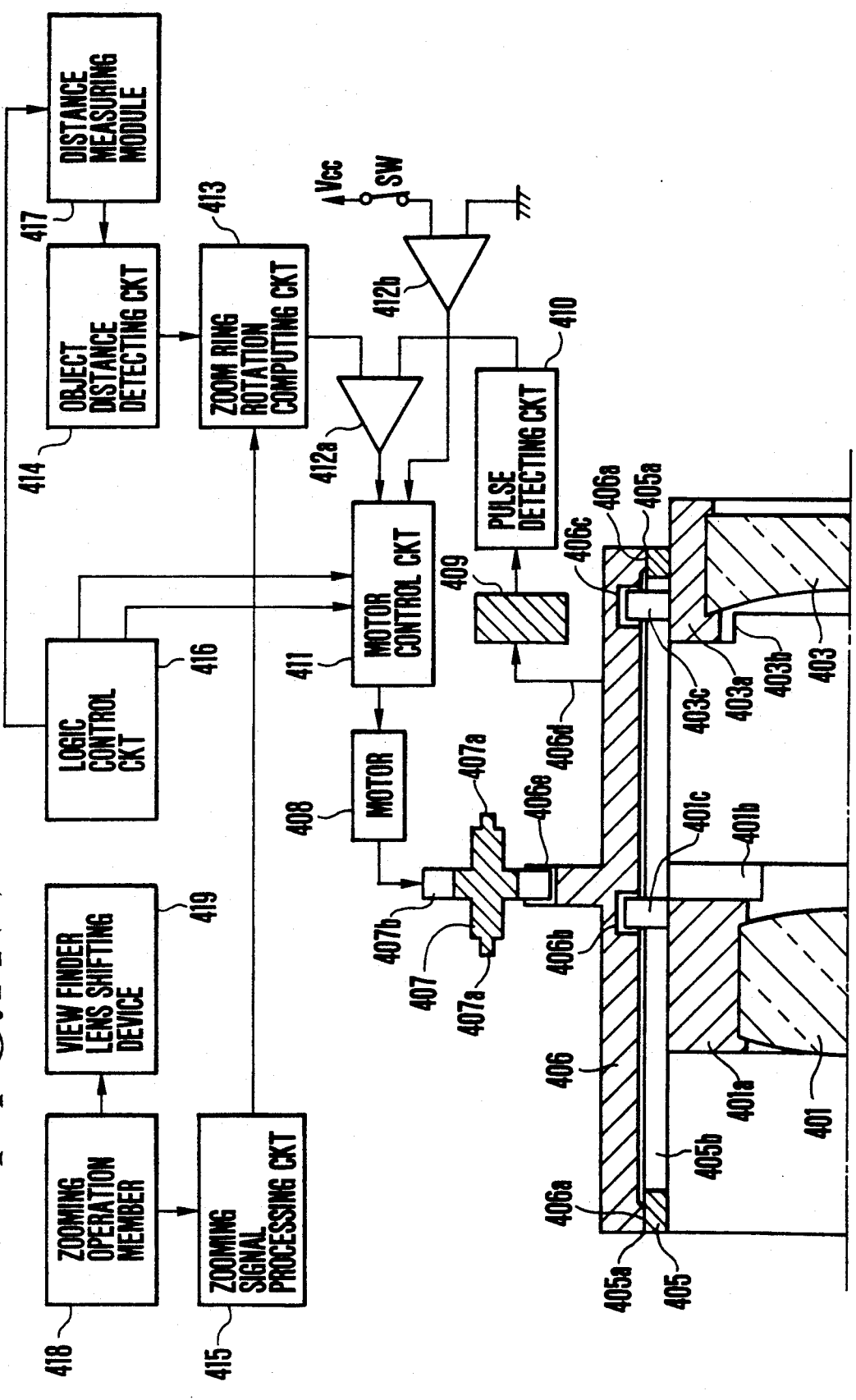
FIG. 14(a) shows the details of the arrangement of a device corresponding to the movement shown in FIG. 13.

FIGS. 14(a) and 14(b) show an arrangement required for operating the photo-taking lens system in the manner as shown in FIG. 13. FIG. 14(a) shows the arrangement in a state of operating the lens system in the wide angle region and FIG. 14(b) shows it in a state of operating the lens system in the telephoto region. These illustration include the convex lens unit 401 and the concave lens unit 403 which are also shown in FIG. 13; a convex lens frame 401a; a cutaway part 401b provided in the frame 401a; a pin 401c which is fitted through a straight slot 405b formed in a fixed frame 405 and is arranged to engage a lead cam groove 406b formed in the zoom ring 406; a concave lens frame 403a; a protrudent part 403b formed on the frame 403a; and a pin 403c which is also fitted through the straight slot 405b into another lead cam groove 406c of the zoom ring 406. These cam grooves 40b and 406c are arranged to form the movement loci of the lens units 401 and 403 as represented by arrows in FIG. 13. The peripheral parts of the lens frames 401a and 403a are slidably fitted to the inner circumferential part of the fixed frame 405.

The fixed frame 405 has its inner circumferential part fitted on the above-stated lens frames 401a and 403a. The outer circumferential part 405a of the fixed frame 405 fittingly engages the inner diameter part 406a of the zoom ring 406. The fixed frame 405 is provided with the slot 405b which is straightly cut in parallel to the optical axis of the lens system. The slot 405b has the pins 401c and 403c fitted therein as mentioned in the foregoing.

In this specific example, both the pins 401c and 403c are fitted into the same slot 405b. However, they may be arranged to be fitted into different slots.

The zoom ring 406 is rotatably carried by the fixed frame 405 with the inner diameter part 406a fitted on the outer circumferential part of the fixed frame 405. The ring 406 is provided with the lead cam groove 406b for the convex lens unit 401; the lead cam groove 406c for the concave lens unit 403; a contact piece or a terminal 406d for a known encoder; and a gear part 406e which engages a gear 407.

The gear 407 is rotatably carried by a shaft 407a and is provided with a gear part 407b which engages the gear part 406e of the zoom ring 406 and is interlocked with a motor 408 via a known reduction gear train. A pulse plate 409 is formed in a doughnut shaped disc with a pattern formed thereon. A reference numeral denotes a pulse detecting circuit. A known motor control circuit 411 is arranged to supply a motor with a current for forward rotation thereof according to the output of a comparator 412a and with another current for reverse rotation of the motor according to the output of another comparator 412b.

A zoom ring rotation computing circuit 413 consists of a known addition circuit, etc. The circuit 413 is arranged to perform a computing operation by adding up signals produced from an object distance detecting circuit 414 and a zooming signal processing circuit 415 in a manner as shown in Table 1 below:

TABLE 1

| Focal length of the lens | Signal from processing circuit 415 | Signal from detecting circuit 414 | | Input signal supplied to comparator 412a |
| --- | --- | --- | --- | --- |
| 35 mm | 10 | 8 m | 0 | 10 |
|  |  | 4 m | 1 | 11 |
|  |  | ∫ |  | ∫ |
|  |  | 0.6 m | 9 | 14 |
| 40 mm | 20 | 8 m | 0 | 20 |
|  |  | ∫ |  | ∫ |
|  |  | ∫ |  | ∫ |
|  |  | 0.6 m | 9 | 29 |
| 45 mm | 30 | 8 m | 0 | 30 |
|  |  | ∫ |  | ∫ |
|  |  | ∫ |  | ∫ |
|  |  | 0.6 m | 9 | 39 |
| 50 mm | 40 | 8 m | 0 | 40 |
|  |  | 4 m | 1 | 41 |
|  |  | ∫ |  | ∫ |
|  |  | 0.6 m | 9 | 49 |

TABLE 1-continued

| Focal length of the lens | Signal from processing circuit 415 | Signal from detecting circuit 414 | Input signal supplied to comparator 412a |
|---|---|---|---|
| 57 mm | 50 | 8 m    0<br>∫<br>0.6 m    9 | 50<br>∫<br>59 |
| 64 mm | 60 | 8 m    0<br>∫<br>0.6 m    9 | 60<br>∫<br>69 |
| 70 mm | 70 | 8 m    0<br>∫<br>0.6 m    9 | 70<br>∫<br>79 |

An object distance detecting circuit 414 is arranged to digitize object distance data obtained from a distance measuring module 417 and to supply the digitized data to the computating circuit 413. A zooming operation member 418 is arranged to continuously vary the magnification of the lens between the focal lengths 35 mm and 70 mm. A position signal representing each of the focal length positions selected by the operation member 418 is processed by a zooming signal processing circuit 415. The circuit 415 converts the position signals into numerical values from 10 to 70 as shown in Table 1. The numerical data thus obtained is supplied to a zoom ring rotation computing circuit 413. Further, the zooming operation member 418 also serves to actuate a view finder lens shifting device 419.

A logic control circuit 416 is composed of a microcomputer, etc. When the photographer pushes the shutter release button to its first stroke point, a power supply switch is turned on. The control circuit 416 then supplies a start signal to a distance measurement module 417. After the lapse of a length of time which is long enough for completion of a distance measuring action, the control circuit 416 supplies a motor start signal to a motor control circuit 411.

FIGS. 15(a) and 15(b) respectively show the details of operation of the zooming operation member 418 and that of the viewfinder lens shifting device 419 performed under the conditions shown in FIGS. 14(a) and 14(b). The illustrations include an objective lens 421, a moving lens 422 and an eyepiece 423. The moving lens 422 is provided with a zoom pin 422a and is arranged to be movable to the left and the right as viewed in the drawings in a known manner. A spring, which is not shown, urges the moving lens to move to the left and keeps it in a state of abutting on the idling part 424c of a zooming cam lever 424. The zooming cam lever 424 is arranged to be vertically slidable as viewed in the drawings and is guided by pins which are fitted into slots 424a formed in the lever 424. The lever 424 is provided with a cam part 424b, the idling part 424c and an end face part 424d. One end of a zooming operation knob 425 is arranged to push the lever 424 while a spring, which is not shown, is arranged to urge the lever to move upward as viewed in the drawings.

The zooming operation knob is provided for a manual operation by the photographer. A suitable degree of friction is imparted by a known method to the manual operation in sliding the knob 425 in the vertical direction as viewed in the drawings. The zooming operation knob 425 is provided with a brush 425b which slides together with the knob when the lower end part 425a pushes the end face part 424d of the above-stated zoom cam lever 424. A pattern 426 is formed with a resistor on a substrate which is not shown. Circuit connection to the pattern 426 is made from above as viewed on the drawings. The resistance pattern short-circuits when the brush 425b is caused to slide thereon by the above-stated zooming operation and thus generates a position signal representing the position of the zooming operation knob 425.

FIG. 16 shows the details of the zooming signal processing circuit of FIGS. 14(a) and 14(b). The illustration includes a power supply 431; a switch 432 interlocked with the shutter release button; a variable resistor 433 which is composed of the above-stated resistance pattern 426 and the brush 425b; a voltage detecting circuit 434 which is arranged to convert the resistance value of the variable resistor 433 into a voltage value; and an A/D converting circuit 435 which is arranged to convert each of the voltage values produced from the voltage detecting circuit 434 into such a signal as shown in Table 1 before the signal is supplied to the zoom ring rotation computing circuit 413.

The embodiment which is arranged as described above operates as described below:

The photographer holds the camera and looks into the viewfinder. He or she operates the operation knob 425 to shift the moving lens 422 via the cam lever 424. The photographer thus sets the magnification of the view finder. Concurrently with this setting operation, the brush 425b slides on the resistance pattern 426 to set the resistance value of the variable resistor 433 accordingly. Under this condition, when the photographer pushes the shutter release button to its first stroke point, the power supply switch turns on. Then, in response to a signal from the logic control circuit 416, the distance measurement module 417 performs a distance measuring action. A signal produced from the module 417 is supplied to and digitized by the object distance detecting circuit 414. The digitized signal is supplied to the zoom ring rotation computing circuit 413. Further, with the switch 432 closed, the voltage detecting circuit 434 produces a voltage corresponding to the resistance value of the variable resistor 433. The voltage thus produced is digitized by the A/D converting circuit 435. A digital signal thus obtained is then applied to the zoom ring rotation computing circuit 413 as the output of the zooming signal processing circuit 415. The computing circuit 413 then performs a computing operation according to the outputs of the detecting circuit 414 and the processing circuit 415 as shown in Table 1. Assuming that the zooming operation member 418 is at a change-over position f=52 mm when the object distance is 4 m, for example, the outputs of the two circuits are added up and a numerical value of 41 is stored as shown in Table 1 and this value is used as the reference value of the comparator 412a.

After the lapse of a predetermined period of time, a start signal from the logic control circuit 416 is applied to the motor control circuit 411. In response to this signal, the motor 416 is caused to rotate forward. The forward rotation of the motor causes the zoom ring 406 to rotate from a wide angle position toward the telephoto side. The rotation of the zoom ring 406 is converted by a pulse plate 409 pulse signal and is produced from the pulse plate 409. The rotation is then detected by the pulse detecting circuit 410. A detection signal thus produced from the circuit 410 is applied to the comparator 412a. Then, the pulses of the pulse signal are produced up to ten pulses when the photo-taking lens is to be moved forward to the position of FIG. 14(a) from the stowed positions of the lens units 401 and 403. With the motor 408 rotated forward, the zoom ring moves from the position of FIG. 14(a) to the position of FIG. 14(b). The pulse plate 409 then produces position signals, one after another, accordingly, as the zoom ring moves. When the number of pulses reaches 41, the output level of the comparator 412 changes and an end signal is produced. The zoom ring rotation computing circuit 413 then produces a motor short-circuiting signal and supplies it to the motor control circuit 411. The motor control circuit 411 applies electrical brake to the motor 408 to bring the rotation of it to a stop by short-circuiting the two terminals thereof.

At that time, the rotating degree of the zoom ring 406 is about 260° according to the arrangement shown in FIG. 13. After that, when the photographer pushes the shutter release button to the second stroke point thereof, an exposure effecting action is performed in a known manner. When the release button returns to its original position, the logic control circuit 416 instructs the motor control circuit 416 to cause the motor 408 to make reverse rotation. The zoom ring 406 is then turned round toward the wide angle side thereof. Upon arrival of the zoom ring 406 at its initial position, a switch SW turns off and the output level of the comparator 412b changes. The motor 408 comes to a stop. A one frame portion of the film is taken up by known film winding means. The camera returns to the state obtained prior to the pushing operation on the shutter release button.

In the specific embodiment described, the focal length is arranged to be shiftable to a total of seven points between 35 mm and 70 mm. However, in accordance with this invention, the number of shiftable or selectable points can be likewise arranged either to be more than or less than seven points.

Furthermore, in the above embodiment, a forward movement of the photo-taking lens according to the magnification of the viewfinder is actuated by the depression of the release button. However, this actuation may be effected by an operation means other than the release button.

In the embodiment, time for stopping the motor 408 is determined by detecting the position of the photo-taking lens by means of the pulse plate 409 and the pulse detecting circuit 410. However, this invention is not limited to this arrangement. A pulse motor may be employed as the motor 408; and the position of the photo-taking lens may be determined by causing the pulse motor to rotate according to a number of pulses produced from the computing circuit 413. This modification obviates the necessity of using the pulse plate 409, the pulse detecting circuit 410 and the comparator 412a with the output of the computing circuit 413 directly supplied to the motor control circuit 411.

The magnification change-over device, which is arranged according to this invention as described in the foregoing, is highly advantageous for a camera of the kind having the photo-taking lens and the viewfinder arranged independently of each other, because, in accordance with this invention: The magnification change-over device comprises a magnification variable photo-taking lens; a magnification variable viewfinder; operating means for changing the magnification of the viewfinder; detecting means for detecting the state of magnification of the viewfinder; and driving means for driving the photo-taking lens according to the detection signal of the detecting means in performing a photo-taking operation. After the magnification of the viewfinder is selected and set, the magnification of the photo-taking lens is changed according to the selected magnification of the viewfinder only when a photo-taking operation is actually performed. During the process of determining a picture composition, it is only the magnification of the viewfinder that is changed for the purpose of composing a picture. Therefore, the picture composing process can be easily repeated. Then, the magnification of the photo-taking lens comes to be adjusted only at the time of actual photo-taking operation. This arrangement effectively prevents the photo-taking lens driving energy from being wasted. Further, since the photo-taking lens is required to be operated only for a short period of time for actual photographing, the invented device is advantageous also in terms of light shielding arrangement of the camera of the kind having the photo-taking lens and the viewfinder arranged independently of each other.

Further, in accordance with this invention, the quide means, such as a cam groove, for shifting the magnification of the photo-taking lens and the cam groove for focus adjustment are continuously and alternately arranged with each other. The invention thus simplifies the conventional complex device wherein cam grooves are provided separately for changing the magnification of the photo-taking lens and for adjustment of the focal point of the lens. Further, in this case, the magnification of the photo-taking lens varies in a non-continuous manner. However, with the invented device applied to a camera having the photo-taking lens and the viewfinder arranged independently of each other, it causes no inconvenience to the photographer as the viewfinder is arranged to have its magnification continuously variable. Meanwhile, the magnification of the photo-taking lens can be adjusted most closely to the selected magnification of the viewfinder. Therefore, this invention makes the simplification of the structural arrangement and improvement in operability compatible with each other.

What is claimed is:

1. A camera having a magnification change-over device, comprising:
  a) A photo-taking optical system having a magnification which is variable;
  b) a viewfinder optical system having a magnification which is variable;
  c) operating means for varying the magnification of said viewfinder optical system;
  d) detecting means for detecting the magnifying state of said viewfinder optical system; and
  e) driving means for driving said photo-taking optical system in response to the output of said detecting means to change the magnification of said photo-taking optical system, wherein said driving means includes start means for starting the driving operation of said driving means in response to a shutter release operation.

2. A camera according to claim 1, wherein said operating means includes a manual operating mechanism for varying the magnification of said view finder optical system.

3. A camera according to claim 1, wherein said detecting means includes a switch which is interlocked with said operating means.

4. A camera according to claim 1, wherein said driving means includes a helicoidal bar which is arranged to transmit the driving force of said driving means to said photo-taking optical system.

5. A camera according to claim 4, wherein said photo-taking optical system includes a first optical system and a second optical system, said first and second optical systems being disposed with a shutter interposed in between them and are arranged to be driven by said helicoidal bar.

6. A camera according to claim 4, wherein said photo-taking optical system includes first and second optical systems which are arranged to be driven by said helicoidal bar with a stop interposed in between said first and second optical systems.

7. A camera according to claim 5, wherein said helicoidal bar is arranged to extend passing by one side of said shutter.

8. A camera according to claim 6, wherein said helicoidal bar is arranged to extend passing by one side of said stop.

9. A camera according to claim 1, wherein said driving means includes manual operation means for causing said driving means to begin to drive by manually operating said manual operation means.

10. A camera according to claim 1, wherein said start means includes electromagnetic start means.

11. A camera according to claim 1, further comprising control means for bringing said photo-taking optical system back to an initial position thereof after completion of an exposure effecting action.

12. A camera according to claim 1, further comprising:
  f) focus adjustment signal forming means for forming a signal for adjustment of a focal point; and
  g) computing means for computing, on the basis of an output of said focus adjustment signal forming means and that of said detecting means, to obtain an extent to which said photo-taking optical system is to be shifted.

13. A camera having a magnification change-over device, comprising:
  (a) a finder for viewing an object to be photographed, said finder indicating a photographic magnification:
  (b) a photographic optical system variable in magnification;
  (c) response means for varying the magnification of said photographic optical system in response to the photographic magnification indicated by said finder; and
  (d) change-over means for changing over the photographic magnification indicated by said finder, said change-over means being provided so as to change over the photographic magnification indicated by said finder without actuating said response means.

14. A camera according to claim 13, wherein said response means includes actuation means for starting the operation of said response means by action of shutter release operation means.

15. A camera according to claim 13, and further comprising operation means for starting the operation of the response means by manual operation.

16. A camera according to claim 13, wherein said response means includes judging means for judging the status of the photographic magnification indicated by said finder.

17. A camera according to claim 13, and further comprising restoration means for restoring the photographic optical system to an initial state after completion of an exposure.

18. A camera having a magnification change-over device, comprising:
  (a) a photographic optical system variable in photographic range;
  (b) a finder for viewing an object to be photographed, said finder indicating a photographic range of the photographic optical system;
  (c) response means for varying the photographic range of the photographic optical system in response to the photographic range indicated by the finder; and
  (d) change-over means for changing over the photographic range indicated by the finder, said change-over means changing over the photographic range indicated by the finder without actuating the response means.

19. A camera according to claim 18, wherein said response means includes actuation means for starting the operation of said response means by action of shutter release operation means.

20. A camera according to claim 18, and further comprising operation means for starting the operation of the response means by manual operation.

21. A camera according to claim 18, wherein said response means includes judging means for judging the status of the photographic range indicated by the finder.

22. A camera according to claim 18, and further comprising restoration means for restoring the photographic optical system to an initial state after completion of an exposure.

23. A camera having a magnification change-over device, comprising:
  (a) a finder for viewing an object to be photographed, said finder indicating a photographic magnification, which magnification is continuously variable;
  (b) a photographic optical device variable in magnification in response to the photographic magnification indicated by the finder, said optical device varying the magnification discontinuously.

24. A device according to claim 23, wherein said photographic optical device includes means for providing a magnification closest to a magnification indicated by the finder.

25. A camera according to claim 23, wherein said photographic optical device includes means for focal adjustment utilizing a photographic range where the photographic optical device does not vary the magnification.

26. A camera according to claim 25, wherein said photographic optical device further includes operation means for continuously performing the variation of the magnification of the photographic optical device and the focal adjustment.

27. A camera according to claim 26, wherein said photographic optical device further includes:
  (a) judgment means for judging the status of the magnification indicated by the finder;
  (b) focal adjustment information forming means for forming focal adjustment information; and
  (c) computing means for computing an amount of adjustment of the photographic optical device on the basis of outputs of the judgment means and the focal adjustment information forming means.

28. A camera according to claim 27, wherein said photographic optical device further includes means for restoring to an initial position after completion of an exposure operation.

29. A camera according to claim 26, wherein said operation means includes a common drive bar.

30. A camera having a magnification change-over device, comprising:
   (a) a finder for viewing an object to be photographed, said finder indicating a photographic magnification;
   (b) a photographic optical system variable in magnification;
   (c) first means for changing over the photographic magnification indicated by the finder;
   (d) second means for changing over the photographic magnification at the photographic optical system; and
   (e) control means for driving said first means first and then driving said second means.

31. A camera according to claim 30, wherein said control means includes actuation means for starting the operation of said second means by action of shutter release operation means.

32. A camera according to claim 30, and further comprising operation means for manually starting the operation of said second means.

33. A camera according to claim 30, wherein said second means includes judging means for judging the status of the photographic magnification indicated by said finder.

34. A camera according to claim 30, and further comprising restoration means for restoring the photographic optical system to an initial state after completion of an exposure.

35. A camera having a magnification change-over device, comprising:
   (a) a finder for viewing an object to be photographed, said finder indicating a photographic magnification; and
   (b) a photographic optical device variable in magnification in response to the photographic magnification indicated by the finder, said photographic optical device digitally converting the photographic magnification indicated by the finder and varying in its magnification discontinuously in response to the digitally converted value.

* * * * *